(12) United States Patent
Weller et al.

(10) Patent No.: US 7,041,394 B2
(45) Date of Patent: May 9, 2006

(54) MAGNETIC RECORDING MEDIA HAVING SELF ORGANIZED MAGNETIC ARRAYS

(75) Inventors: Dieter Klaus Weller, Gibsonia, PA (US); Neil Deeman, Alamo, CA (US); Rene Johannes Marinus van de Veerdonk, Pittsburgh, PA (US); Nisha Shukla, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 79 days.

(21) Appl. No.: 10/005,244

(22) Filed: Dec. 3, 2001

(65) Prior Publication Data

US 2002/0132083 A1  Sep. 19, 2002

Related U.S. Application Data

(60) Provisional application No. 60/275,969, filed on Mar. 15, 2001.

(51) Int. Cl.
*G11B 5/64* (2006.01)

(52) U.S. Cl. ............... 428/836; 428/836.1; 428/848.1

(58) Field of Classification Search ........... 428/836, 428/836.1, 848.1
See application file for complete search history.

(56) References Cited

U.S. PATENT DOCUMENTS

| | | | |
|---|---|---|---|
| 4,656,546 A | 4/1987 | Mallory | |
| 5,139,884 A * | 8/1992 | Daimon et al. | 428/402 |
| 5,210,673 A | 5/1993 | Ito et al. | |
| 5,462,784 A * | 10/1995 | Grill et al. | 428/65.5 |
| 5,603,766 A | 2/1997 | Visokay et al. | |
| 5,851,644 A * | 12/1998 | McArdle et al. | 428/213 |
| 5,851,656 A | 12/1998 | Ohkubo | |
| 5,942,342 A | 8/1999 | Hikosaka et al. | |
| 5,965,194 A | 10/1999 | Truong et al. | |
| 5,981,053 A * | 11/1999 | Naylor et al. | 428/323 |
| 5,993,956 A | 11/1999 | Lambeth et al. | |
| 5,998,002 A | 12/1999 | Harada et al. | |
| 6,162,532 A * | 12/2000 | Black et al. | 428/323 |
| 6,262,129 B1 * | 7/2001 | Murray et al. | 516/33 |
| 6,265,021 B1 | 7/2001 | Black et al. | |
| 6,541,386 B1 * | 4/2003 | Aiba et al. | 438/707 |
| 6,562,633 B1 * | 5/2003 | Misewich et al. | 438/3 |
| 6,602,620 B1 * | 8/2003 | Kikitsu et al. | 428/694 T |
| 2001/0006744 A1 * | 7/2001 | Saito | 428/694 TM |
| 2002/0145826 A1 * | 10/2002 | Zangari et al. | 360/135 |
| 2003/0222048 A1 * | 12/2003 | Asakawa et al. | 216/2 |

(Continued)

FOREIGN PATENT DOCUMENTS

JP         2000-311448    * 7/2000

OTHER PUBLICATIONS

S.H. Charap, Pu-Ling Lu and Yanjun He Thermal Stability of Recorded Information at High Densities IEEE Transactions on Magnetics, vol. 33, No. 1, Jan. 1997.

(Continued)

*Primary Examiner*—Kevin M. Bernatz
(74) *Attorney, Agent, or Firm*—Buchanan Ingersoll PC (57) ABSTRACT

A magnetic recording disc is provided according to the present invention for magnetic recording. The magnetic recording disc includes a disc substrate having a locking pattern etched therein. Chemically synthesized iron-platinum particles are provided in the locking pattern and completely fill the locking pattern. The chemically synthesized iron-platinum nanoparticles exhibit short-range order characteristics forming self organized magnetic arrays.

15 Claims, 5 Drawing Sheets

U.S. PATENT DOCUMENTS

2004/0229006 A1* 11/2004 Momose et al. ........... 428/65.3

OTHER PUBLICATIONS

Hitachi Develops World Highest Density HD Apr. 5, 2000 Reuters Company News.

Read-Rite First Shatter 50 Gigabit Per Square Inch Areal Density Barrier, Mar. 30, 2000, PR Newswire.

Fujitsu Develops HDD Media Technology with Potential for 300 Gb/sq. inch Recording Density; 56 Gb/sq.in. Recording Density Already Demonstrated, Apr. 6, 2000 Business Wire.

H.N. Bertram and M. Williams SNR and Density Limit Estimates: A Comparison of Longitudinal and Perpendicular Recording IEEE Transactions on Magnetics, vol. 36, No. 1, Jan. 2000.

Dieter Weller, Andreas Moser, Liesl Folks, Margaret E. Best, Wen Lee, Mike F. Toney, M. Schwickert, Jan-Ulrich Thiele and Mary F. Doerner High $K_u$ Materials Approach to 100 Gbits/in$^2$ IEEE Transactions on Magnetics, vol. 36, No. 1, Jan. 2000.

Shouheng Sun, C.B. Murray, Dieter Weller, Liesl Folks, and Andreas Moser Monodisperse FePt Nanoparticle and Ferromagnetic FePt Nanocrystal Superlattices Science, Mar. 17, 2000; vol. 287, pp. 1989-1992.

S. Sun, D. Weller and C.B. Murray "Self-Assembled Magnetic Nanoparticles Arrays" in Physics of Magnetic Recording Chapter 9, ed. Plumer, van Elk, Weller, Springer (2001).

G. Hughes "Patterned Media" In Physics of Magnetic Recording, Chpt 7, ed. Plumer, van Elk, Weller, Springer (2001).

* cited by examiner

MAGNETIC RECORDING MEDIA HAVING SELF ORGANIZED MAGNETIC ARRAYS

CROSS-REFERENCE TO RELATED APPLICATIONS

This application claims the benefit of co-pending provisional patent application Ser. No. 60/275,969 entitled "Self Organized Magnetic Arrays (SOMA) for Magnetic Recording Media", filed on Mar. 15, 2001, the entire disclosure of which is incorporated by reference herein.

FIELD OF THE INVENTION

The present invention is directed toward magnetic recording media and, more particularly, toward magnetic recording media having self organized magnetic arrays for high density recording.

BACKGROUND OF THE INVENTION

Increased storage capacity in magnetic recording has traditionally been addressed through improvements in the ability to store information on a particular storage disc with an increased areal density, e.g., decreasing the size of the optical spot formed by the laser light in a magneto-optical system. Until recently, these prior art approaches have been adequate for increasing the storage capacity of magnetic recording discs.

Recently, however, the areal density in magnetic recording technologies has reached 20 Gbit/in$^2$ in certain products, and is increasing at a rate of approximately 100% per year. Data rates are approaching Gbit/s levels and are increasing at a rate of approximately 30–40% per year. An earlier perceived density limit of 40 Gbit/in$^2$ has been surpassed in laboratory demonstrations. Densities in the range of 36–63 Gbit/in$^2$ have been demonstrated. In perpendicular recording technology, densities in the range of 100–500 Gbit/in$^2$ have been targeted, and are considered feasible. These projections are generally based upon scaling assumptions and projected future technological advancements in the areas of read/write heads, recording media, channel electronics, tribological coatings, head-to-disc interface and narrow track servo capabilities.

An area of particular importance in magnetic recording is media noise suppression. At higher areal densities, smaller particles, or grains, are required to reduce the intrinsic media noise and obtain a higher signal-to-noise ratio in the read-back data. In addition to reducing and scaling the media grain size, control of the magnetic grain isolation and uniformity and control of the crystallographic texturing are also used to suppress media noise. Achieving low noise media by scaling to a small grain size, however, is limited by thermal instabilities. Such thermal instabilities are exhibited when using grain diameters below approximately 8–10 nm, and may render today's commonly used cobalt-alloy based recording media unsuitable for archival data storage purposes.

It has been found that smaller, stable grains can be obtained from magnetically harder materials, such as tetragonal L1$_0$ phased iron-platinum (FePt) or cobalt-platinum (CoPt) compounds, or artificially layered materials, such as Co/Pt or Co/Pd multilayers. FePt and CoPt compounds are known for their high magnetocrystalline anisotropy and magnetic moment, properties that are desirable for high density magnetic recording media. Other candidates for smaller, stable grain sizes are rare earth transition metal compounds, such as Co$_5$Sm or Nd$_2$Fe$_{14}$B. However, it may be difficult to maintain these materials in a chemically stable state in hard disc media where minimal overcoat thickness is mandatory.

A common problem with high anisotropy materials, such as FePt and CoPt compounds, is their large coercivity, which can reach values on the order of 50,000 Oe. Such large coercivities far exceed the write field capabilities of today's magnetic recording heads. In an effort to alleviate the problem of large coercivity, vertical recording and thermally assisted recording schemes have been proposed.

Lithographically patterned media, also known as bit-patterning, may postpone the arrival of thermal instabilities in the recording media. Bit-patterning combines several hundred media grains into one single magnetic island, which does not require large coercivities. A comprehensive review of such lithographically patterned media techniques can be found in G. Hughes, "Patterned Media" in *Physics of Ultrahigh Density Magnetic Recording*, chapter 7, ed. Plumer, van Ek, Weller, Springer (2001), which reference is hereby incorporated herein by reference. The achievable densities using this bit-patterning lithographic approach is limited by lithography to approximately 1 Tbit/in$^2$. In order to push beyond the density limit set by lithography, self-assembled nanoparticle arrays have been proposed. These self-assembled, ordered and uniform nano-magnet arrays provide conceivable solutions to many proposed future recording schemes, e.g., conventional granular media, perpendicular media, thermally assisted recording and patterned media recording schemes. A representative 6 nm FePt nanoparticle array with typical dimensions and achievable areal densities is shown in FIG. 1.

Figure 1:
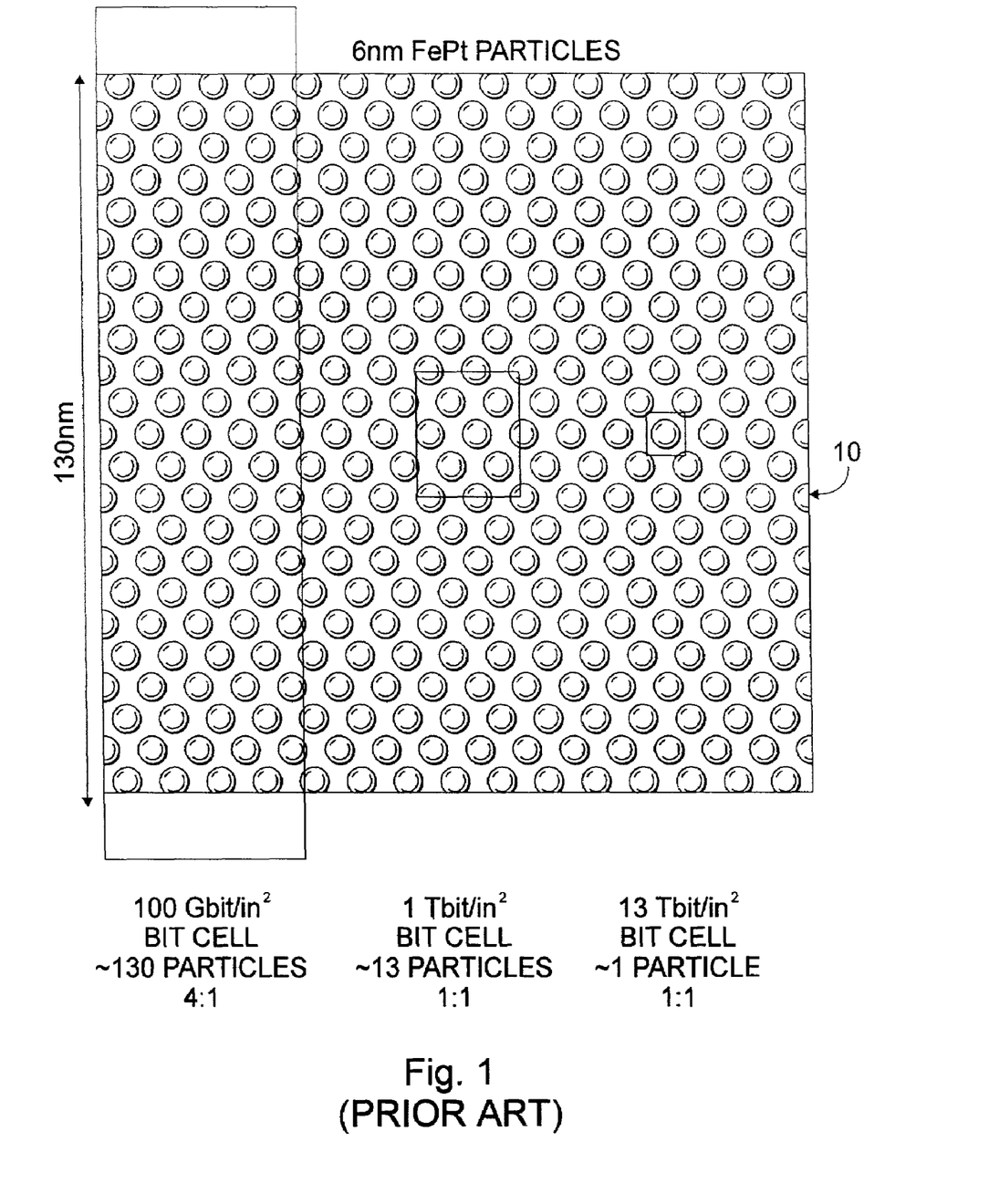
FIG. 1 is a representation of a prior art 6 nm FePt nanoparticle array.

The specific array 10 shown in FIG. 1 has a surface area of approximately 130×130 nm$^2$ and includes approximately 260 particles per layer. The array 10 has a corresponding particle density per surface area of approximately 10 Tparticles/in$^2$. In future single particle per bit patterned recording schemes, this particle density per surface area could lead to respective areal bit densities of approximately 10 Tbit/in$^2$. However, the use of self-assembled nanoparticle arrays presents many technological challenges. One such challenge involves the large scale ordering of particles. Typical FePt arrays have been shown to order on a lateral structural coherence length, (i.e., the distance over which uniform, ordered arrays as shown in FIG. 1 can be formed), on the order of 100–1000 nm. This is far less than required in typical magnetic recording discs, which are approximately 3" in diameter.

The present invention is directed toward overcoming one or more of the above-mentioned problems.

SUMMARY OF THE INVENTION

A magnetic recording disc is provided according to the present invention for magnetic recording. The magnetic recording disc includes a disc substrate having a locking pattern etched therein. Chemically synthesized iron-platinum nanoparticles are provided in the locking pattern and completely fill the locking pattern. The chemically synthesized iron-platinum nanoparticles exhibit short-range order characteristics forming self organized magnetic arrays. In addition to chemically synthesized iron-platinum (FePt) nanoparticles, chemically synthesized CoPt, FePd and MnAl nanoparticles, as well as ferroelectric nanoparticles, may also be utilized. However, utilization of ferroelectric nanoparticles will result in ferroelectric storage media, and not magnetic.

In one form, the chemically synthesized iron-platinum nanoparticles have a grain size of 3–10 nm, and the locking pattern formed in the disc substrate includes a pit depth of 5–20 nm. Typically, the chemically synthesized iron-platinum nanoparticles include a self-assembly-coherence length scale of 100–1000 nm.

For longevity purposes, the magnetic recording disc is typically provided with a protective layer of carbon covering the and the chemically synthesized iron-platinum nanoparticles which are self-assembled in the locking pattern. In addition to carbon, other protective layers may include CH, CN, CHN, CH/CF, AlN, SiN, BN, etc., and also other films like MgO, $Al_2O_3$, TiN, TiC, etc. The disc substrate is generally made of glass, quartz, Si, $SiO_2$, ceramic or AlMg.

A method for manufacturing a magnetic recording disc for magnetic recording according to the present invention is also provided. The inventive method includes providing a disc substrate, forming a locking pattern in the disc substrate, and depositing nanoparticles in the locking pattern such that the nanoparticles self-assemble in the locking pattern forming self organized magnetic arrays.

In one form of the inventive method, the nanoparticles include chemically synthesized iron-platinum nanoparticles having a grain size of 3–10 nm. The locking pattern formed in the disc substrate preferably includes a pit depth of 5–20 nm.

In another form of the inventive method, the locking pattern is formed in the disc substrate by applying a layer of photoresist on the disc substrate, removing select portions of the photoresist to form a topographical pattern corresponding to the locking pattern, and etching the locking pattern into the disc substrate in areas where the photoresist has been removed. The photoresist remaining on the disc substrate, after the locking pattern has been etched into the disc substrate, is then removed.

In still another form of the inventive method, the locking pattern is etched into the disc substrate using a reactive ion etching process. The topographical pattern may be formed in the photoresist layer using laser beam lithography, electron beam lithography, deep UV lithography or nano-imprinting techniques.

In yet another form of the inventive method, a first chemical substance is deposited on the disc substrate at areas corresponding to the locking pattern, and a second chemical substance is deposited on the disc substrate at areas not corresponding to the locking pattern. The first chemical substance attracts the nanoparticles, while the second chemical substance repels the nanoparticles. Such deposit of chemical substances aids in the formation of the nanoparticle arrays in the locking pattern.

It is an aspect of the present invention to combine large scale "lithographic" patterning on a length scale compatible with standard optical or electron lithography with small scale "natural" patterning using self-assembly of nanoparticles.

Other aspects and advantages of the present invention can be obtained from a study of the specification, the drawings, and the appended claims.

DETAILED DESCRIPTION OF THE INVENTION

Figure 2:
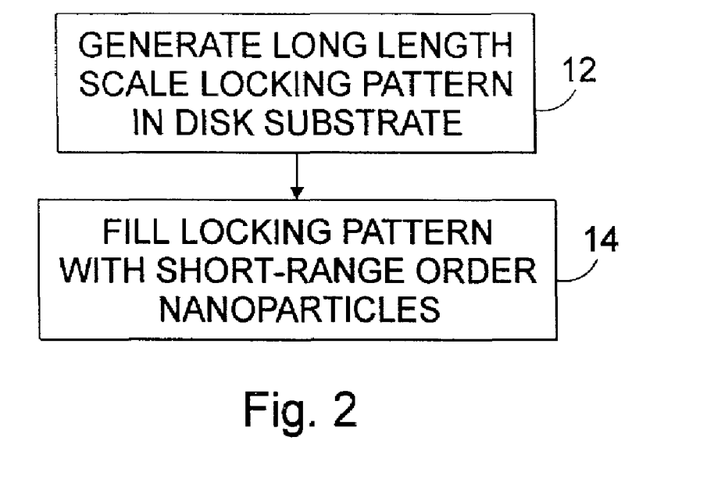
FIG. 2 is a block flow diagram of the inventive method of manufacturing a magnetic recording disc.

As illustrated in FIG. 2, the magnetic recording disc of the present invention is generally manufactured utilizing a two-step fabrication process. The first step, shown at 12, includes pre-patterning a magnetic recording disc substrate to generate a long length scale topographic locking pattern on the disc substrate. In the second step of the inventive method, shown at 14, the locking pattern is filled with short-range order magnetic nanoparticles. The short-range order characteristics exhibited by the nanoparticles are such that nanoparticles will form an ordered structure across a short length scale. The nanoparticles form self organized magnetic arrays and planarize the disc substrate surface. One method of generating the locking pattern in the disc substrate will now be described with respect to FIGS. 3–8.

Figure 3:
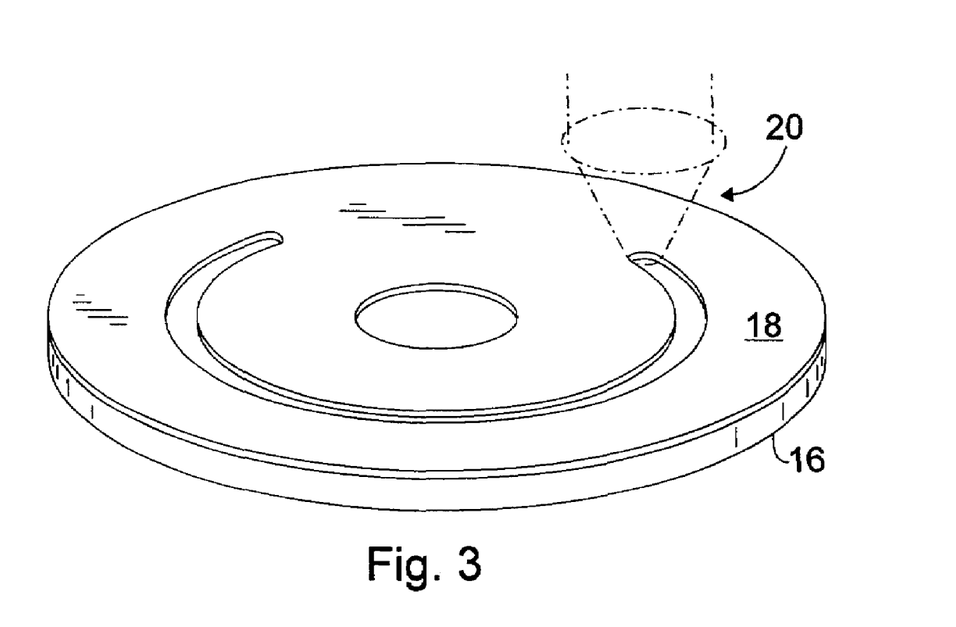
FIG. 3 is a perspective view of a disc substrate with a photoresist layer used in the manufacture of the inventive magnetic recording disc.
Figure 4:
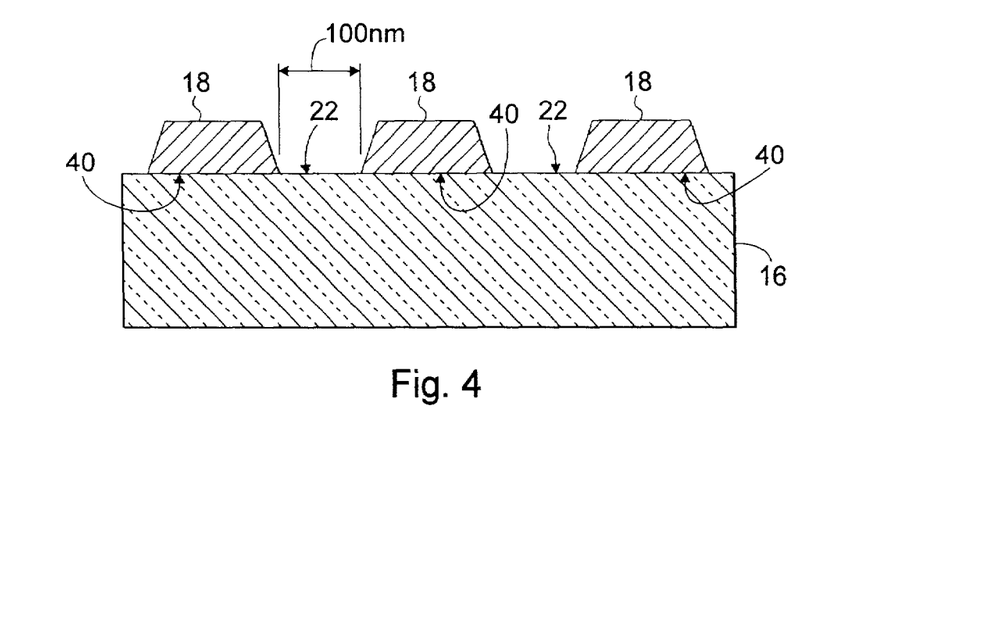
FIG. 4 is a side view of a section of the substrate and photoresist shown in FIG. 3 after removal of certain portions of the photoresist.

FIG. 3 illustrates a magnetic recording disc substrate 16 having a layer of photoresist 18 provided thereon. Select portions of the photoresist layer 18 are removed, as shown at 20, to form a topographical pattern in the photoresist layer 18. The inventive method contemplates forming the topographical pattern in the photoresisit layer 18 using a variety of methods, such as, but not limited to, standard laser beam lithography, electron beam lithography, deep UV lithography and nano-imprinting techniques. FIG. 4 illustrates a section of the substrate 16 and photoresisit 18 of FIG. 3 after removal of portions of the photoresist 18 to form the topographical pattern. Depending upon the type of storage solution in which the magnetic recording disc is designed to be used, e.g., spinning disc magnetic storage or non-rotating magnetic storage (xy-matrix probe storage), the magnetic disc recording substrate 16 may be made of a variety of materials, including, but not limited to, AlMg, glass, ceramic, Si, quartz, $SiO_2$, etc.

After removal of the photoresist 18, a locking pattern is etched into the disc substrate 16 in areas 22 where the photoresist 18 has been removed. In one example, the locking pattern is etched into the disc substrate 16 utilizing a reactive ion etching process, and has typical dimensions of sub-micron down to 100 nm. After the locking pattern has been etched into the disc substrate 16, any photoresist 18 remaining on the disc substrate 16 is removed. The locking pattern, as used herein, is the prepatterned region or etched pits on the disc substrate sized such that the length scale of the region or pits is compatible with the self-ordering scale of the nanoparticles.

Figure 5:
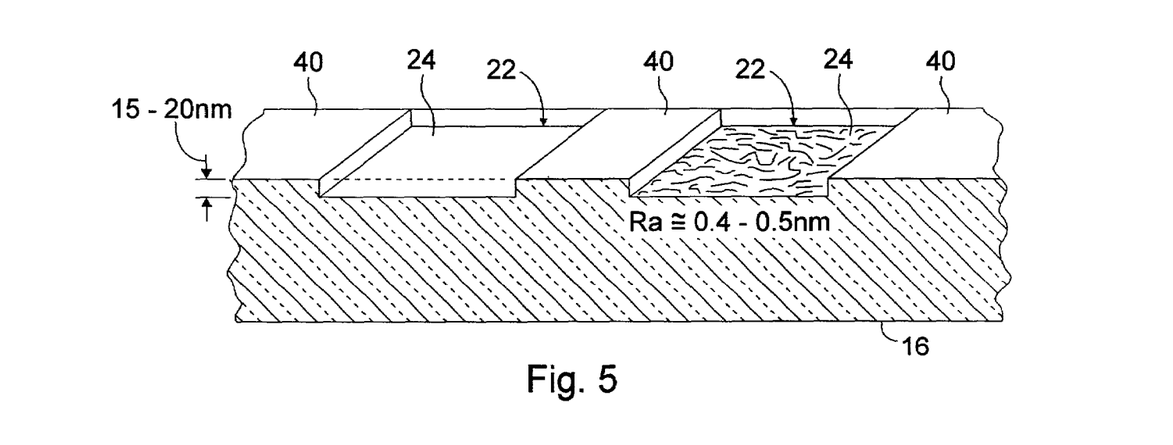
FIG. 5 is a perspective view of a section of the disc substrate after a locking pattern has been etched in the disc substrate.

As shown in FIG. 5, the locking pattern includes a pit depth ranging between 5–20 nm deep, depending upon the size the nanoparticles to be used in subsequent processing. Using a reactive ion etching process, the surface 24 of each pit forming the locking pattern will have a roughness (Ra) equal to approximately 0.4–0.5 nm. Various type of locking patterns may be utilized, including, but not limited to, a square pit pattern (see FIG. 6) for a set of one or more bits, or a groove pattern (see FIG. 7) for a set of one or more tracks, or islands in certain locations to create a coarse grid to stabilize the fine grid formed by the nanoparticles deposited in the locking pattern.

Additionally, the locking pattern may act as a servo pattern providing positioning information usable by a magnetic read/write head (not shown). Altering the sizes and shapes of the pits forming the locking pattern in accordance with a predefined servo pattern would enable the magnetic read/write head to determine its location on the surface of the magnetic recording disc.

Instead of utilizing the photoresist layer 18, the topographical pattern may be nano-imprinted directly onto a Sol-Gel-type coating on the disc substrate 16 (for instance, a solution of TEOS, water, and $HNO_3$), leaving the desired topographical pattern after drying. The locking pattern is then etched in the disc substrate 16, and the Sol-Gel-type coating is removed. Alternatively, the topographical pattern formed in the Sol-Gel-type coating could itself serve as the locking pattern. The Sol-Gel-type coating would remain on the disc substrate 16, and nanoparticles 26 would be deposited into the topographical/locking pattern formed in the Sol-Gel-type coating in the same manner as the nanoparticles are deposited into the locking pattern in the disc substrate 16, which will be described hereafter. A third option is to create a flat chemically activated surface consisting of two types of chemical substances spatially separated according to the desired topographical pattern. One type of chemical attracts and the other type repels the nanoparticles. These types of chemically active, patterned mono layers may be prepared using a number of well known techniques, such as ionic molecular self-assembly processes.

Figure 6:
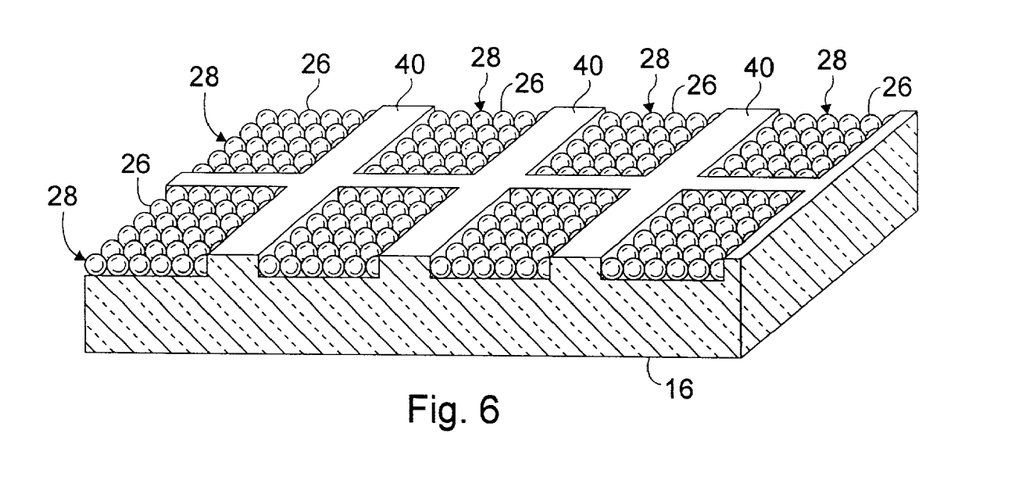
FIG. 6 is a perspective view of a section of the disc substrate after nanoparticles have self-assembled in the locking pattern.

After the locking pattern has been etched into the disc substrate 16, the discs are "planarized" by filling the locking pattern with nanoparticles 26 such that the nanoparticles, self-assemble into the locking pattern forming magnetic arrays 28. In one example, the nanoparticles 26 include chemically synthesized iron-platinum nanoparticles which exhibit laterally structural coherence length properties on the order of 100–1000 nm. The chemically synthesized iron-platinum nanoparticles 26 self-assemble into the locking pit pattern according to various well known techniques, such as those set forth in S. Sun, C. B. Murray, D. Weller, L. Folks and A. Moser, Science 287, 289 (2000), and S. Sun, D. Weller and C. B. Murray, "Self-Assembled Magnetic Nanoparticle Arrays" in *Physics of Magnetic Recording*, chapter 9, ed. Plumer, van Ek, Weller, Springer (2001), which references are hereby incorporated herein by reference. The locking pattern is formed in the disc substrate 16 according to the self-assembly coherence length scale of the iron-platinum nanoparticles and, accordingly, the iron-platinum nanoparticles self-assemble therein. In one example, the iron-platinum nanoparticles include a grain size of 4 nm, however, grain sizes ranging from 3–10 nm may be utilized without departing from the spirit and scope of the present invention.

Additionally, while the present invention has been described herein as using iron-platinum (FePt) nanoparticles, other high anisotropy materials having appropriate $L1_0$ phase characteristics may be utilized without departing from the spirit and scope of the present invention. Such high anisotropy L10 phased materials include, but are not limited to, CoPt, FePd, MnAl, etc. So that the nanoparticles may self-assemble in the locking pattern, it is contemplated herein that the nanoparticles deposited in the locking pattern be of a single magnetic species. For example, the deposited nanoparticles should be either all FePt particles, all CoPt particles, all FePd particles, all MnAl particles, etc.

Figure 7:
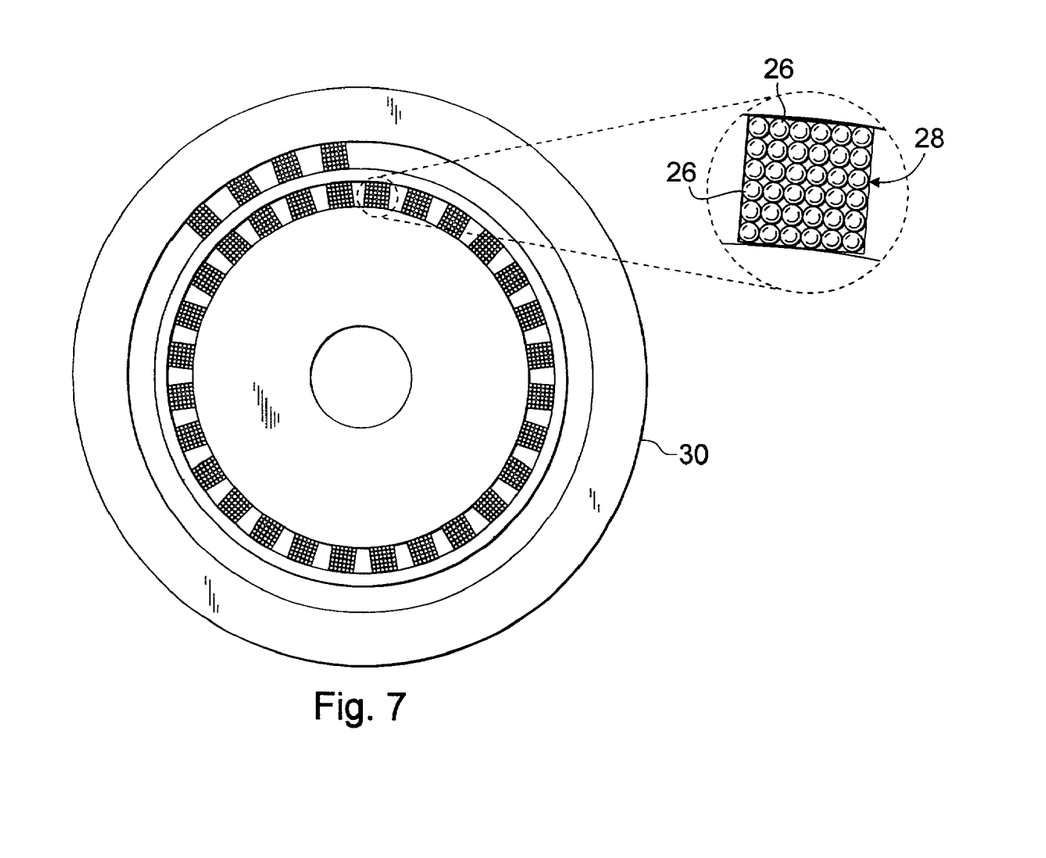
FIG. 7 is a top view of the inventive magnetic recording disc illustrating the formation of magnetic arrays in a grooved locking pattern.

FIG. 7 illustrates the finished inventive magnetic recording disc 30 having a grooved pit pattern. The exploded portion illustrates the self-assembled magnetic arrays 28 formed by the nanoparticles 26 in the grooved pit pattern.

Figure 8:
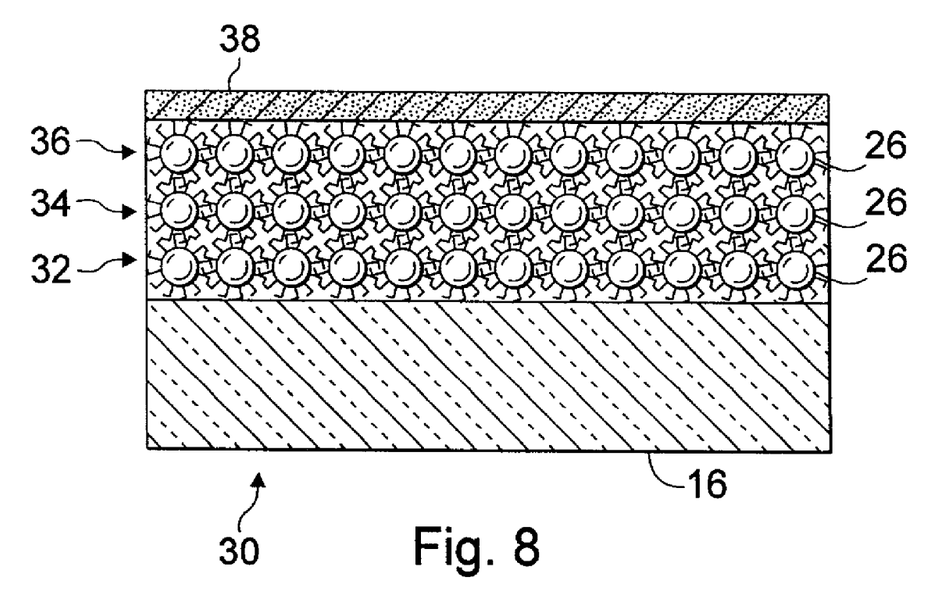
FIG. 8 is a side view of a section of the inventive magnetic recording disc illustrating three layers of self-assembled nanoparticles and a carbon coating on the disc surface.

Depending upon the pit depth of the locking pattern and the grain size of the iron-platinum nanoparticles 26, two or more layers of nanoparticles 26 may self-assemble in the locking pattern. FIG. 8 illustrates the self-assembly of three layers, 32, 34 and 36 of iron-platinum nanoparticles 26 in the locking pattern. Typically, as shown in FIG. 8, a protective coating layer 38 is provided over the entire surface of the disc substrate 16 and formed nanoparticle arrays 28 for longevity of use purposes. The protective coating layer 38 protects the magnetic recording media against damage from direct contact with the read/write head and also serves as a corrosion barrier to prevent oxidation of the magnetic recording media. The protective coating layer may be made of a variety of materials having appropriate protective properties, including, but not limited to, carbon and diamond like carbon (hydrogenated carbon, nitrogenated carbon, fluoronated carbon, etc.) and nitrides, such as, silicon-nitride, aluminum-nitride, etc.

Additionally, chemically active substances maybe provided on the disc substrate 16 surface to assist in nanoparticle 26 assembly. For example, a first chemical substance may be deposited on the disc substrate 16 at the areas 22 corresponding to the locking pattern. A second chemical substance may be deposited on the disc substrate 16 at areas 40 not corresponding to the locking pattern. The first chemical substance will have properties such that it attracts the nanoparticles 26, such that a chemical covalent bond is formed between the first chemical substance and the nanoparticles, while the second chemical substance will have properties such that it repels the nanoparticles 26, such that no bond forms between the second chemical substance and the nanoparticles. Thus, by applying such chemical substances on the disc substrate 16 surface, which can be applied during or after generation of the locking pattern, it is possible to further manipulate the areas in which the nanoparticles 26 will self-assemble to form the magnetic arrays 28.

As an alternative to providing two types of chemical substances to attract and repel the nanoparticles, respectively, one layer of chemical substance may be provided and modified by selectively replacing the end-groups of the chemical substance. Since the end-groups of the chemical substances provide the bonding to the nanoparticles, selectively modifying the end-groups results in a chemical substance that either attracts or repels the nanoparticles 26 as desired. Such modification may be accomplished by local oxidation or reduction by exposure to UV-light or x-rays in an appropriate chemical environment.

As a further alternative to providing two types of chemical substances, the disc substrate 16 may be coated with a thin layer (e.g., 5–20 nm) of the second chemical substance that repels the nanoparticles 26. Using any of the above-described techniques, the locking pattern is etched through the thin layer (second chemical substance) and into the disc substrate 16. The locking pattern formed in the disc substrate 16 is dimensioned to attract the nanoparticles 26 due to the coherence length properties of the nanoparticles 26, while the thin layer of the second chemical substance repels the nanoparticles 26 aiding in nanoparticle 26 formation in the locking pattern. The thickness of the nanoparticle repellant layer is determined by the depth of the locking pattern, with the underlying disc substrate 16 providing an ideal etch stop to the etching process.

While the present invention has been described with particular reference to the drawings, it should be understood that various modifications could be made without departing from the spirit and scope of the present invention. For example, instead of using chemically synthesized magnetic nanoparticles, small ferroelectric nanoparticles could be utilized which self-assemble into the locking pattern in the same manner as the above-described magnetic nanoparticles. The polarization of the ferroelectric nanoparticles could be switched using an electric field in a fashion similar to the perpendicular recording scheme described above for the chemically synthesized magnetic nanoparticles.

The invention claimed is:

1. A magnetic recording disc for magnetic recording comprising:
   a disc substrate having a locking pattern formed therein, the locking pattern comprising a plurality of pits formed in the disc substrate; and
   a plurality of nanoparticles completely filling the plurality of pits and exhibiting short-range order characteristics, wherein each individual pit includes a plurality of nanoparticles therein,
   said plurality of nanoparticles consisting of a single magnetic species.

2. The magnetic recording disc of claim 1, wherein the nanoparticles comprise chemically synthesized nanoparticles having a grain size of 3–10 nm.

3. The magnetic recording disc of claim 2, wherein the chemically synthesized nanoparticles comprise FePt, CoPt, FePd or MnAl nanoparticles.

4. The magnetic recording disc of claim 1, wherein the disc substrate comprises glass, quartz, Si, $SiO_2$, ceramic or AlMg.

5. The magnetic recording disc of claim 1, wherein the plurality of pits formed in the disc substrate include a pit depth of 5–20 nm.

6. The magnetic recording disc of claim 1, wherein the nanoparticles include a self-assembly-coherence length scale of 100–1000 nm.

7. The magnetic recording disc of claim 1, further comprising a protective coating layer covering the disc substrate and the nanoparticles.

8. The magnetic recording disc of claim 1, wherein the locking pattern is formed in accordance with a self-assembly-coherence length scale of the plurality of nanoparticles.

9. A data storage medium for magnetic recording comprising:
   a substrate having a locking pattern formed therein, the locking pattern comprising a plurality of pits formed in the substrate; and
   a plurality of nanoparticles completely filling the plurality of pits and exhibiting short-range order characteristics, wherein each individual pit includes a plurality of nanoparticles therein,
   said plurality of nanoparticles consisting of a single magnetic species.

10. The data storage medium of claim 9, wherein the nanoparticles comprise chemically synthesized nanoparticles having a grain size of 3–10 nm.

11. The data storage medium of claim 10, wherein the chemically synthesized nanoparticles comprise FePt, CoPt, FePd or MnAl nanoparticles.

12. The data storage medium of claim 9, wherein the substrate comprises glass, quartz, Si, $SiO_2$, ceramic or AlMg.

13. The data storage medium of claim 9, wherein the plurality of pits formed in the substrate include a pit depth of 5–20 nm.

14. The data storage medium of claim 9, wherein the nanoparticles include a self-assembly-coherence length scale of 100–1000 nm.

15. The data storage medium of claim 9, wherein the locking pattern is formed in accordance with a self-assembly-coherence length scale of the plurality of nanoparticles.

* * * * *